United States Patent
Mori (10) Patent No.: US 8,708,005 B2
(45) Date of Patent: Apr. 29, 2014

(54) GAS FILLING SYSTEM

(75) Inventor: Tomoyuki Mori, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/387,665

(22) PCT Filed: Jun. 16, 2010

(86) PCT No.: PCT/IB2010/001443
§ 371 (c)(1), (2), (4) Date: Jan. 27, 2012

(87) PCT Pub. No.: WO2011/012937
PCT Pub. Date: Feb. 3, 2011

(65) Prior Publication Data
US 2012/0125482 A1   May 24, 2012

(30) Foreign Application Priority Data
Jul. 30, 2009   (JP) ................................ 2009-177498

(51) Int. Cl.
*B65B 3/26* (2006.01)

(52) U.S. Cl.
USPC ............................... 141/197; 141/94; 141/95

(58) Field of Classification Search
USPC ........... 141/2, 4, 69, 83, 94–95, 98, 197–198, 141/231, 39
See application file for complete search history.

(56) References Cited

U.S. PATENT DOCUMENTS

| | | | |
|---|---|---|---|
| 5,570,729 A | 11/1996 | Mutter | |
| 5,628,349 A | 5/1997 | Diggins et al. | |
| 5,810,058 A * | 9/1998 | Kountz et al. | 141/83 |
| 5,868,176 A | 2/1999 | Barajas et al. | |
| 6,598,624 B2 * | 7/2003 | Togasawa et al. | 141/1 |
| 6,672,340 B2 * | 1/2004 | Mutter | 141/4 |
| 7,059,364 B2 * | 6/2006 | Kountz et al. | 141/4 |
| 7,325,561 B2 * | 2/2008 | Mathison et al. | 137/256 |
| 8,020,589 B2 * | 9/2011 | Cohen et al. | 141/95 |
| 2002/0053365 A1 | 5/2002 | Mutter | |

(Continued)

FOREIGN PATENT DOCUMENTS

| | | |
|---|---|---|
| CN | 102282410 A | 12/2011 |
| DE | 19705601 A1 | 8/1998 |
| DE | 10 2005 033 854 A1 | 1/2007 |
| DE | 20 2007 008 748 U1 | 9/2007 |

(Continued)

OTHER PUBLICATIONS

International Search Report and Written Opinion of PCT/IB2010/001443 mailed Sep. 28, 2010.

(Continued)

*Primary Examiner* — Timothy L Maust
*Assistant Examiner* — Timothy P Kelly
(74) *Attorney, Agent, or Firm* — Kenyon & Kenyon LLP (57) ABSTRACT

A gas filling system includes a vehicle having a gas tank, and a gas station that supplies the gas tank with gas. The vehicle includes a controller having a filling protocol that specifies a method of control on the gas station side that is used when the gas is filled into the gas tank. The gas station controls filling of the gas into the gas tank according to the filling protocol provided by the controller. A filling protocol specific to the vehicle is used and therefore, it is made possible to perform filling adapted to the gas tank of the vehicle.

10 Claims, 7 Drawing Sheets

(56) References Cited

U.S. PATENT DOCUMENTS

| | | |
|---|---|---|
| 2005/0178463 A1 | 8/2005 | Kountz et al. |
| 2005/0247123 A1 | 11/2005 | Fuse |
| 2007/0186982 A1* | 8/2007 | Cohen et al. ............... 137/487.5 |
| 2007/0257043 A1 | 11/2007 | Kanoya et al. |
| 2009/0205745 A1* | 8/2009 | Farese et al. .................... 141/12 |
| 2010/0276031 A1* | 11/2010 | Saiki et al. ......................... 141/1 |
| 2010/0307636 A1* | 12/2010 | Uemura ............................ 141/4 |
| 2012/0000574 A1* | 1/2012 | Nishiumi ......................... 141/94 |
| 2012/0111447 A1* | 5/2012 | Mori et al. ........................ 141/4 |
| 2012/0125480 A1* | 5/2012 | Inagi et al. ........................ 141/4 |
| 2012/0205003 A1* | 8/2012 | Okawachi ....................... 141/95 |
| 2012/0227864 A1* | 9/2012 | Mori ............................. 141/95 |
| 2012/0267002 A1* | 10/2012 | Kittilsen et al. .................. 141/4 |

FOREIGN PATENT DOCUMENTS

| | | |
|---|---|---|
| EP | 1 205 704 A1 | 5/2002 |
| EP | 1 291 574 A2 | 3/2003 |
| EP | 1 291 575 A2 | 3/2003 |
| EP | 2093475 A1 | 8/2009 |
| JP | 2004-028211 A | 1/2004 |
| JP | 2005-069327 A | 3/2005 |
| JP | 2005-127430 A | 5/2005 |
| JP | 2007-147005 A | 6/2007 |
| JP | 2008-281108 A | 11/2008 |

OTHER PUBLICATIONS

International Preliminary Report on Patentability (IPRP) mailed Oct. 4, 2011.

* cited by examiner

GAS FILLING SYSTEM

This is a 371 national phase application of PCT/IB2010/001443 filed 16 Jun. 2010, claiming priority to Japanese Patent Application No. 2009- 177498 filed 30 Jul. 2009, the contents of which are incorporated herein by reference.

BACKGROUND OF THE INVENTION

1. Field of the Invention

The invention relates to a gas filling system for filling gas from a gas station into a gas tank mounted on a vehicle.

2. Description of the Related Art

At the time of filling, a gas-fueled vehicle, on which a gas tank is mounted, such as a fuel cell vehicle, pulls into a gas station and the gas tank is filled with the fuel gas from a filling nozzle. In a gas filling system described in Japanese Patent Application Publication No. 2004-828211 (JP-A-2004-828211), the pressure and the temperature in the gas tank are detected via sensors before starting filling and the detected data are transmitted to the gas station. A central controller on the gas station side calculates the amount of filling based on the received data. After starting filling, the central controller on the gas station side receives the pressure in the gas tank from the vehicle side to monitor whether a specified pressure is reached, to which the gas tank of the vehicle should be charged. When the specified pressure is reached, filling is ended.

When the fuel gas is hydrogen gas, there is a phenomenon that the temperature increases as filling progresses. The more the filling flow rate is increased, the steeper the increase in the gas tank temperature becomes. Thus, there is a fear that the temperature in the gas tank quickly increases and reaches the design temperature (85° C., for example) and filling of a specified amount of gas cannot be completed. On the other hand, when the filling flow rate is reduced, although the rapid increase in temperature is suppressed, the filling time becomes long. In this respect, in JP-A-2004-828211, although the calculation of the filling amount is considered, consideration is given neither to the filling flow rate nor to the filling time.

In addition, there are various kinds of gas tanks, having different heat dissipation capacities, for example. It is expected in the future that gas tanks with improved heat dissipation capacities will be developed. With a gas tank having a high heat dissipation capacity, it is possible to increase the filling flow rate and reduce the filling time. In JP-A-2004-828211, however, filling is performed without taking the characteristics of the gas tank into consideration and therefore, filling is not improved with the improvement of the characteristics of the gas tank at present and in the future.

SUMMARY OF THE INVENTION

The invention provides a gas filling system, with which it is possible to optimize the filling of gas into a gas tank.

A gas filling system according to the invention includes a vehicle having a gas tank, and a gas station that supplies the gas tank with gas, wherein the vehicle has a vehicle-side controller having a filling protocol that specifies a method of control, performed on the gas station side, that is used to fill the gas into the gas tank, and the gas station controls filling of the gas into the gas tank according to the filling protocol provided by the vehicle-side controller.

According to the invention, the vehicle-side controller has the filling protocol, so that it is possible to use the filling protocol determined in consideration of individual statuses on the vehicle side (characteristics of the gas tank, for example). When the filling protocol specific to each vehicle is used, it is possible to perform the filling adapted to the gas tank of the vehicle and it is therefore possible to complete filling a predetermined filling amount (the filling amount for a full tank or the amount of gas to be filled that is designated) of gas in a minimum period of time. In addition, it is necessary neither to prepare the filling protocol nor to renew the prepared filling protocol for each vehicle on the gas station side. Thus, it is made possible to perform the optimum filling operation for the future vehicles (gas tanks).

The vehicle may have a vehicle-side communication device connected to the vehicle-side controller and the gas station may include a station-side communication device that receives the filling protocol from the vehicle-side communication device and a station-side controller that is connected to the station-side communication device and controls the filling of the gas into the gas tank according to the filling protocol received. With this configuration, it is possible to establish a communication between the vehicle and the gas station and therefore, it is possible to easily transmit the filling protocol stored on the vehicle side to the gas station.

A configuration may be employed, in which the gas station includes a gas supply source, a compressor that compresses the gas supplied from the gas supply source, an accumulator that stores the gas compressed by the compressor, and a dispenser that supplies the gas tank with the gas supplied from the accumulator, and at least one of the gas supply source, the compressor, the accumulator, and the dispenser is controlled according to the filling protocol. With this configuration, the devices on the gas station side are controlled according to the filling protocol that has been prepared on the vehicle side and therefore, filling adapted to the vehicle is performed.

The dispenser may have a control valve that controls a flow rate of the gas supplied to the gas tank according to the filling protocol. With this configuration, the flow rate of the gas filled into the gas tank is easily controlled.

The filling protocol may be determined based on a characteristic of the gas tank. The characteristic of the gas tank may be heat dissipation capacity of the gas tank. In this case, it is possible to perform filling according to the filling protocol determined in consideration of the heat dissipation capacity of the gas tank and it is therefore possible to suitably suppress the increase in temperature of the gas tank. Examples of the characteristic of the gas tank include the characteristic that affects the gas tank, such as the cooling characteristic that varies depending on the position of the gas tank on the vehicle, for example.

The gas filling system of the invention may further include a display device that displays an indication that the filling of the gas into the gas tank is being performed or has been performed according to the filling protocol provided by the vehicle-side controller. With this configuration, the filling operator can visually confirm that the filling is being performed or has been performed according to the filling protocol provided from the vehicle side.

A configuration may be employed, in which at least one of the vehicle and the gas station has a filling information input section for inputting filling information, and the gas station controls the filling of the gas into the gas tank according to the filling information input into the filling information input section. In this case, it is possible to input desired filling information and therefore, filling is performed that is favorable for the filling operator. Note that the filling information includes at least one of the filling amount and the filling time.

A configuration may be employed, in which the vehicle has a sensor that acquires information on the inside of the gas tank, the station-side communication device also receives, from the vehicle-side communication device, the information acquired by the sensor, and the station-side controller determines a filling flow rate according to the filling protocol received by the station-side communication, device and the information on the inside of the gas tank in performing control. With this configuration, it is possible to perform filling according to the state in the gas tank to be filled. In addition, because the information on the inside of the gas tank is acquired, it is possible to perform control of the filling flow rate more accurately as compared to the case where such information is estimated.

A configuration may be employed, in which the sensor acquires the information on the inside of the gas tank at the time of starting filling and during filling and, based on the information on the inside of the gas tank during filling, the station-side controller changes the filling flow rate that was determined based on the information on the inside of the gas tank at the time of starting filling. With this configuration, it is possible to perform filling according to the state of the inside of the gas tank that is being filled.

The sensor may include at least one of a temperature sensor and a pressure sensor. In this case, when it is detected that the temperature of the gas tank is high, for example, it is possible to restrict further increase in temperature in the gas tank by reducing the filling flow rate.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Gas filling systems according to example embodiments of the invention will be described below with reference to the attached drawings. An example of the gas filling system will be herein described, in which hydrogen gas is filled from a gas station into a gas tank of a fuel cell vehicle equipped with a fuel cell system. As generally known, the fuel cell system includes a fuel cell that generates electricity through electrochemical reaction between fuel gas (hydrogen gas, for example) and oxidant gas (air, for example).

Figure 1:
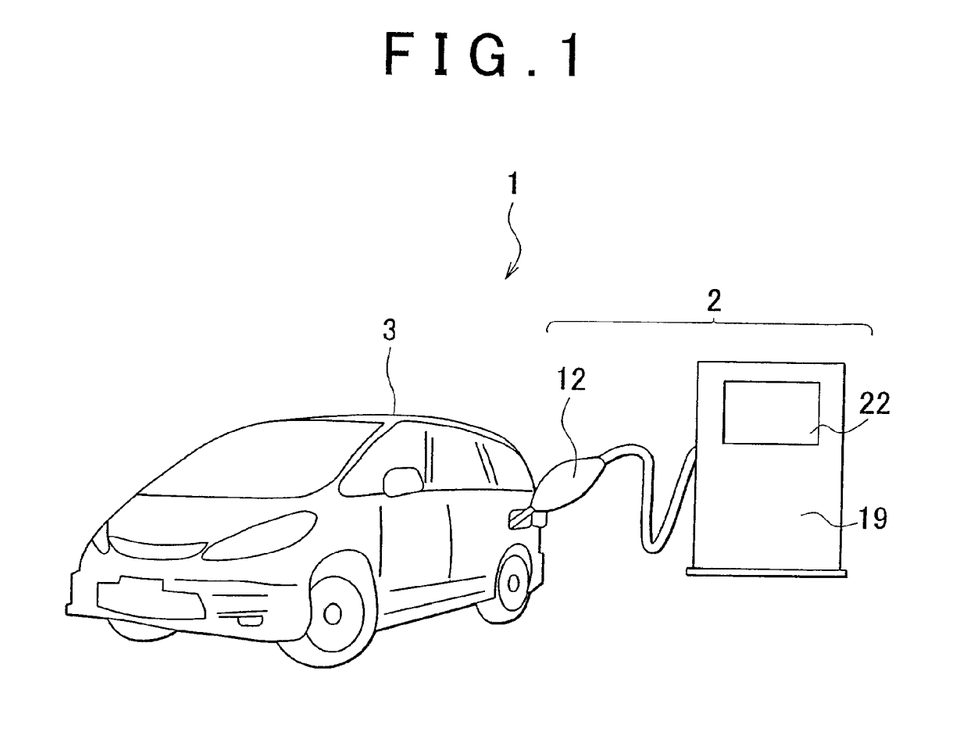
FIG. 1 is a schematic diagram of a gas filling system according to a first embodiment.

As shown in FIG. 1, the gas filling system 1 includes a hydrogen station 2, which functions as the gas station, for example, and a fuel cell vehicle 3 supplied with the hydrogen gas from the hydrogen station 2.

Figure 2:
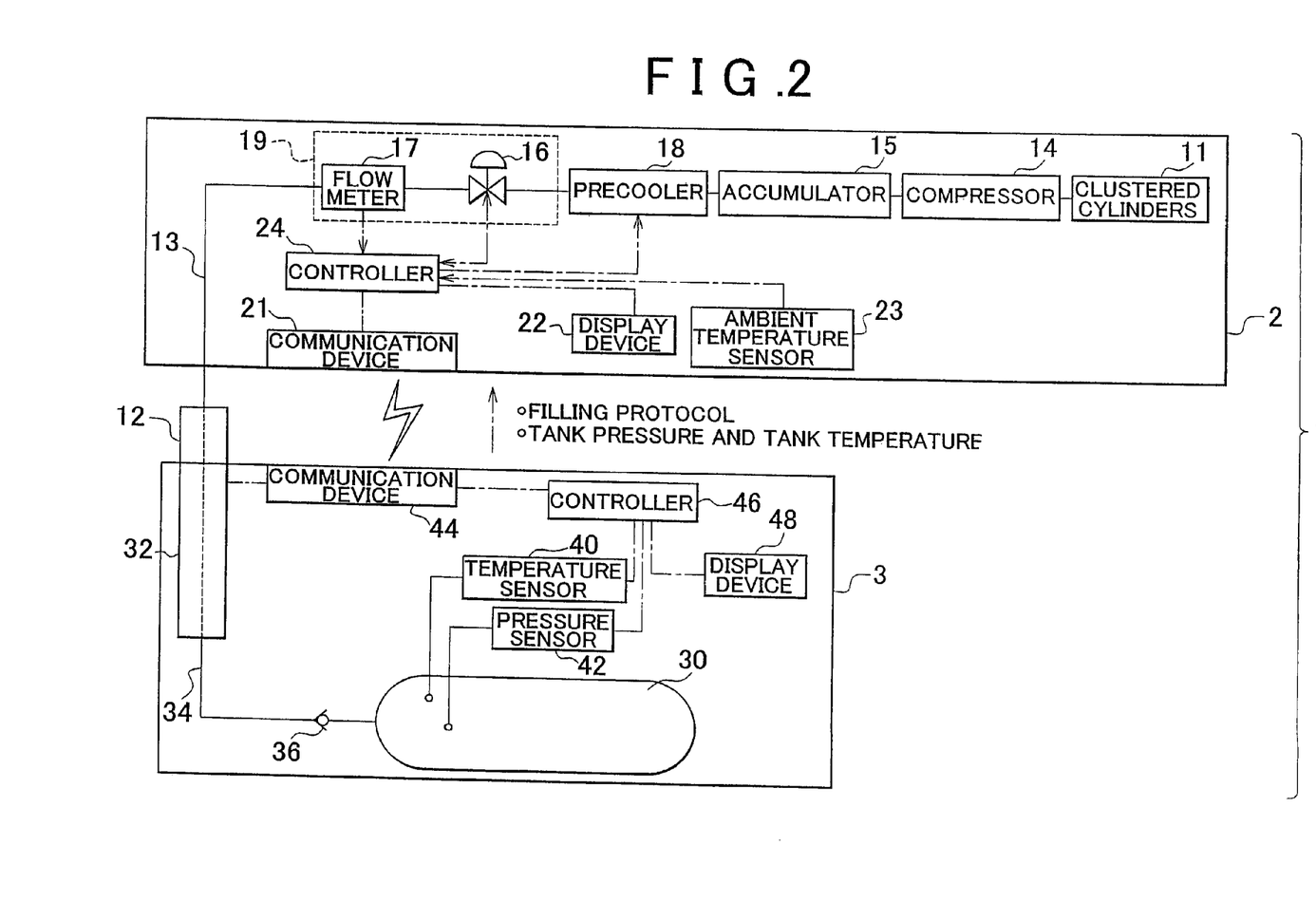
FIG. 2 is a configuration diagram of the gas filling system according to the first embodiment.

As shown in FIG. 2, the hydrogen station 2 has clustered cylinders (gas supply source) 11 that store hydrogen gas, a filling nozzle 12 that discharges hydrogen gas into an on-board gas tank 30, and a gas line 13 that connects the clustered cylinders 11 and the filling nozzle 12. The filling nozzle 12, which is a part also referred to as a filling coupling, is connected to a receptacle 32 of the vehicle 3 when the hydrogen gas is filled. The filling nozzle 12 and the receptacle 32 constitute a connection unit that connects the hydrogen station 2 and the gas tank 30.

The gas line 13 is provided with: a compressor 14 that pressurizes and discharges the hydrogen gas supplied from the clustered cylinders 11; an accumulator 15 that stores the hydrogen gas that has been pressurized to a predetermined pressure by the compressor 14; a precooler 18 that precools the hydrogen gas supplied from the accumulator 15; and a dispenser 19 that supplies the hydrogen gas from the precooler 18 to the filling nozzle 12, in this order from the clustered cylinders 11 side. The hydrogen station 2 includes a communication device 21, a display device 22, an ambient temperature sensor 23, and a controller 24. Various devices are electrically connected to the controller 24. Although not illustrated, a cutoff valve that opens the gas line 13 during filling is provided in or downstream of the accumulator 15 or in the dispenser 19.

The precooler 18 cools the hydrogen gas that is supplied from the accumulator 15 at approximately room temperature, to a predetermined low temperature (−20° C., for example) by heat exchange. The type of the heat exchange in the precooler 18 may be any of the indirect type, the intermediate medium type, and the regenerative type and one of the publicly known structures may be used. For example, the precooler 18 has a pipeline portion, through which the hydrogen gas flows, and in the precooler 18, the pipeline portion is housed in a container, in which coolant flows, so that heat is exchanged between the hydrogen gas and the coolant. In this case, the cooling temperature of the hydrogen gas may be controlled by controlling the amount and the temperature of the coolant supplied to the container.

The dispenser 19 includes a flow rate control valve 16 that controls the flow rate of the hydrogen gas supplied to the filling nozzle 12 and a flow meter 17 that measures the flow rate of the hydrogen gas. The flow rate control valve 16 is an electrically driven valve and includes a stepping motor, for example, as the driving power source. The degree of opening of the flow rate control valve 16 is changed by the stepping motor according to the command from the controller 24, so that the flow rate of the hydrogen gas is controlled. In this way, the filling flow rate, at which the hydrogen gas is filled into the gas tank 30, is controlled. The thus-controlled filling flow rate is measured by the flow meter 17 and the controller 24 receives the measurement result and feedback-controls the flow rate control valve 16 so as to achieve a desired filling flow rate. It is also possible to use another flow rate controller than the flow rate control valve 16.

The communication device 21 has a communication interface for performing wireless communication, such as infrared data communication, for example. The communication device 21 is provided in the filling nozzle 12. The display device 22 displays various pieces of information, such as information on the filling flow rate during filling, on a screen. The display device 22 may be equipped with an operation panel for selecting or designating the desired filling amount on the display screen. The display device 22 may be provided in part of the body casing that houses the dispenser 19 (see FIG. 1).

The controller 24 is made up of a microcomputer including a central processing unit (CPU), a read only memory (ROM), and a random access memory (RAM) therein: The CPU performs desired calculations according to the control program to perform various processes and control operations. The ROM stores the control program executed by the CPU and control data. The RAM is mainly used as various workspaces for performing control processes. The controller 24 is electrically connected to the clustered cylinders 11, the compressor 14, the accumulator 15, and the precooler 18, for example, in addition to the communication device 21 etc. that are connected to the controller 24 via control lines expressed by chain lines in FIG. 2 and controls the whole of the hydrogen station 2. In addition, the controller 24 transmits the information obtainable in the hydrogen station 2 to the vehicle 3 via the communication device 21.

The vehicle 3 includes the gas tank 30 and the receptacle 32. The gas tank 30 is a fuel gas supply source for supplying fuel to the fuel cell. The gas tank 30 is a high-pressure tank capable of storing hydrogen gas at 35 MPa or 70 MPa, for example. The hydrogen gas in the gas tank 30 is supplied to the fuel cell via the supply pipeline (not shown). The supply of hydrogen gas to the gas tank 30 is performed by the hydrogen station 2 via the receptacle 32 and a filling pipeline 34. The filling pipeline 34 is provided with, for example, a check valve 36 for preventing the hydrogen gas from flowing backward. A temperature sensor 40 and a pressure sensor 42 detect the temperature and the pressure, respectively, of the hydrogen gas in the gas tank 30 and are provided in the supply pipeline or the filling pipeline 34.

The vehicle 3 includes: a communication device 44 that transmits and receives various pieces of information to and from the communication device 21 of the hydrogen station 2; a controller 46 made up of a microcomputer similarly to the controller 24 of the hydrogen station 2; and a display device 48 that displays various pieces of information on a screen. The communication device 44 is compatible with the communication device 21 and the communication device 44 has a communication interface for performing wireless communication, such as infrared data communication, for example. The communication device 44 is incorporated into the receptacle 32 or is fixed in a lid box of the vehicle 3 so that it is possible to establish communication between the communication devices 44 and 21 in a state where the filling nozzle 12 is connected to the receptacle 32. The number of the communication device(s) 44 and the number of the communication device(s) 21 each may be one. However, one of these numbers may be set greater than the other to ensure that a communication is established at the time of connection. The controller 46 receives the results of detection from various sensors including the temperature sensor 40 and the pressure sensor 42 and controls the vehicle 3 based on the results. The controller 46 transmits the information obtainable in the vehicle 3 to the hydrogen station 2 via the communication device 44. The display device 48 can be used as part of the car navigation system, for example.

In the above-described gas filling system 1, when hydrogen gas is filled into the gas tank 30 of the vehicle 3, first, the filling nozzle 12 is connected to the receptacle 32. Then, the hydrogen station 2 is activated. Upon the activation, the hydrogen gas stored in the accumulator 15 is discharged from the filling nozzle 12 to the gas tank 30, whereby the hydrogen gas is filled into the gas tank 30. In the gas filling system 1 of the first embodiment, an instruction as to what type of control should be used in performing filling is provided from the vehicle 3 to the hydrogen station 2.

Next, with reference to the flow chart of FIG. 3, the control of the filling in the gas filling system 1 will be described.

First, when the filling operator connects the filling nozzle 12 to the receptacle 32 (step S1), a wireless communication is established between the hydrogen station 2 and the vehicle 3. After the connecting operation, the vehicle 3 reads in the tank pressure and the tank temperature. The tank pressure is the pressure of the hydrogen gas in the gas tank 30 and is detected by the pressure sensor 42. The tank temperature is the temperature of the hydrogen gas in the gas tank 30 and is detected by the temperature sensor 40. The signals indicative of the results of detection of the tank pressure and the tank temperature are supplied to the controller 46. The controller 46 temporarily stores the detected data of the tank pressure and the tank temperature into the RAM, for example.

Next, the detected data of the tank pressure and the tank temperature and the filling protocol are transmitted from the vehicle 3 to the hydrogen station 2 via communication (step S2). This is performed by the controller 46, which simultaneously transmits the detected data of the tank pressure and the tank temperature and the filling protocol to the communication device 21 of the hydrogen station 2 with the use of the communication device 44.

Next, the controller 24 of the hydrogen station 2 reads in the filling protocol received by the communication device 21 and filling is started based on the detected data of the tank pressure and the tank temperature, which are received simultaneously with the filling protocol (step S3). It should be noted that although not described in detail above, before starting filling, the filling operator performs the filling starting operation, by which the discharge of hydrogen gas from the hydrogen station 2 into the gas tank 30 of the vehicle 3 is allowed. When the preparation for filling on the hydrogen station 2 side has been completed, the hydrogen station 2 is activated and filling is started.

The filling protocol will now be described. The filling protocol is stored in the storing section (ROM, for example) in the controller 46 of the vehicle 3. The filling protocol specifies the method of control, performed on the hydrogen station 2 side, that is used to fill the hydrogen gas into the gas tank 30 of the vehicle 3. The devices controlled according to the filling protocol are those on the gas line 13 of the hydrogen station 2 and the devices may include the clustered cylinders 11, the filling nozzle 12, the compressor 14, the accumulator 15, the flow rate control valve 16, and the precooler 18. Various control operations can be performed, such as control of the amount of ejection from the filling nozzle 12, variation of the operational state (discharge amount and discharge pressure) of the compressor 14, selective discharge of hydrogen gas from a designated accumulator when there are a plurality of the accumulators 15, adjustment of the degree of opening of the flow rate control valve 16, and control of the cooling temperature of the hydrogen gas in the precooler 18. Examples of the manipulated variable or the controlled variable that is manipulated or controlled according to the filling protocol include the filling flow rate (filling speed), at which the hydrogen gas is filled into the gas tank 30, and the rate of increase in pressure in the gas tank 30.

Figure 4:
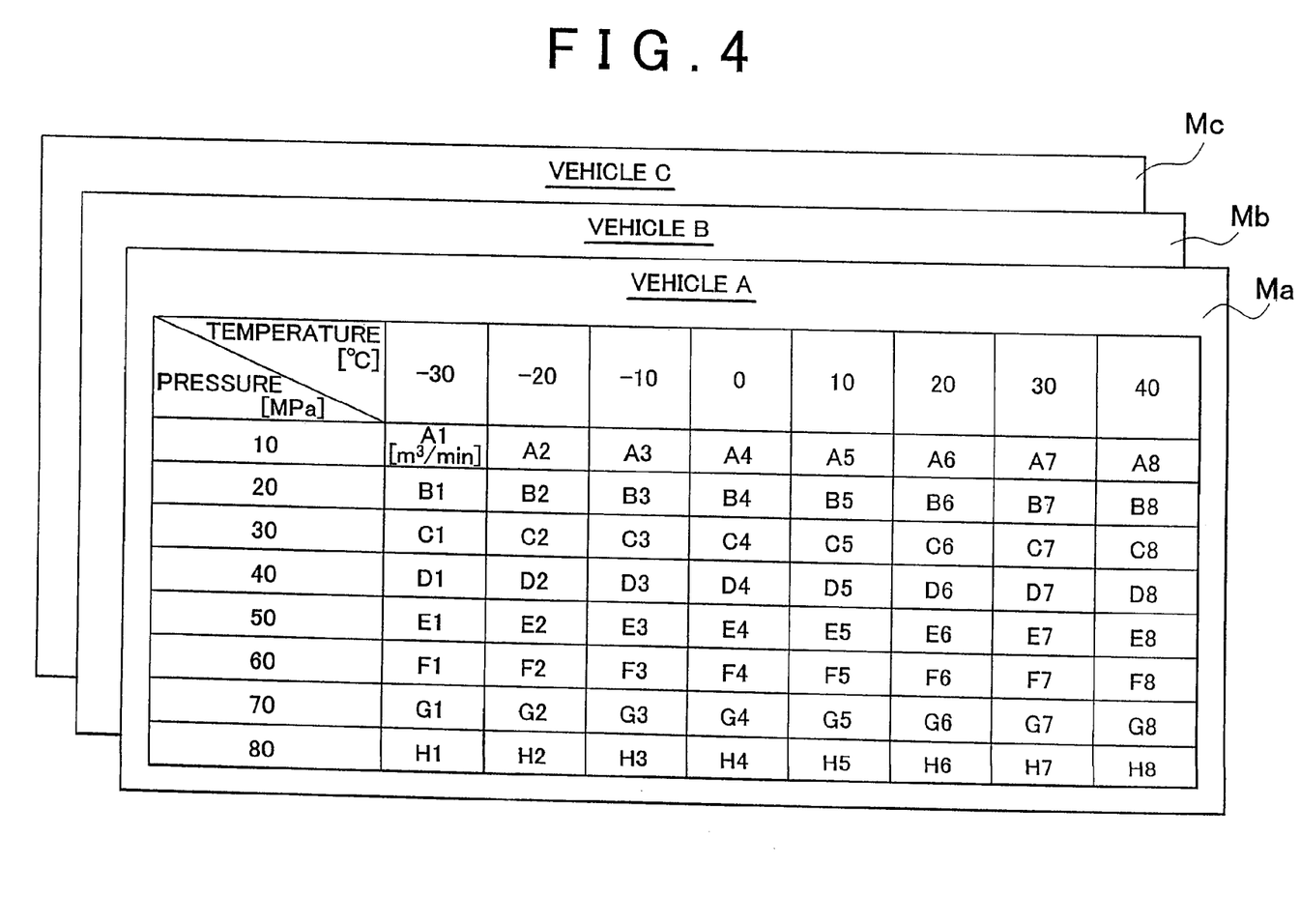
FIG. 4 is a diagram showing an example of a filling flow rate table used in the filling operation according to the first embodiment.

An example according to the first embodiment described below will be described on the assumption that the device controlled with the use of the filling protocol is the flow rate control valve 16 and the controlled variable controlled with the use of the filling protocol is the filling flow rate. The filling protocol in this case includes a filling flow rate table. As shown in FIG. 4, the filling flow rate table is a table, in which the vertical axis indicates the tank pressure and the horizontal axis indicates the tank temperature and is set for each vehicle 3. For example, vehicles A, B, and C that are different from each other are provided with filling flow rate table Ma, Mb, and Mc for the vehicles A, B, and C, respectively.

The filling flow rate (A1, A2, and so on in the filling flow rate map Ma) in the filling flow rate maps is a flow rate that enables the hydrogen gas to be filled into the gas tank 30 smoothly at a high speed under given conditions of the tank pressure and the tank temperature so that the temperature in the gas tank 30 is prevented from reaching a predetermined upper limit value (85° C., for example). In the filling flow rate map Ma, the tank pressure is set at intervals of 10 MPa and the tank temperature is set at intervals of 10° C. However, these intervals may be arbitrarily set.

In the filling flow rate map, the filling flow rate may be increased as the tank pressure increases. In addition, the filling flow rate may be increased as the tank temperature decreases. For example, among the filling flow rates A1 to H8 in the filling flow rate map Ma, the filling flow rate H1 (tank pressure: 80 MPa and tank temperature: −30° C.) is the highest and the filling flow rate A8 (tank pressure: 10 MPa and tank temperature: 40° C.) is the lowest. When a reduced filling flow rate is used in the case of a low tank pressure or a high tank temperature in this way, it is possible to complete filling in a minimum period of time while the temperature in the gas tank 30 is prevented from reaching an upper limit value.

The filling flow rate maps Ma, Mb, and Mc are determined based on the characteristics of the gas tanks 30 on the vehicles A, B, and C, respectively. Specifically, various gas tanks 30 are being developed and the heat dissipation capacity and the rate of increase in temperature vary depending on the material, the surface area, the structure, etc. thereof. For example, when aluminum is used for a liner of the gas tank 30, the heat dissipation capacity of the gas tank 30 is better than the case when a resin, such as polyethylene, is used for the liner. The heat dissipation capacity of the gas tank 30 varies depending also on the properties and the mixing ratio of the resin used for the resin liner. In addition, the cooling characteristics of the gas tank 30 when it is cooled by the vehicle running wind, etc. vary depending on the mounting position of the gas tank 30 in the vehicle 3. Thus, characteristics of the gas tank 30 itself and characteristics that affect the gas tank 30 are not necessarily the same in the existing vehicle 3 and in the future vehicle 3.

Thus, with regard to the filling flow rate maps Ma, Mb, and Mc stored in the controller 46, those, in which the above characteristics of the gas tanks 30 mounted on the vehicles A, B, and C are taken into consideration, are used. For example, in the case of the vehicle A, of which the gas tank 30 is lined with aluminum, the value of the filling flow rate is higher than in the case of the vehicle B, of which the gas tank 30 is lined with resin, under the same conditions of the tank pressure and the tank temperature.

Returning back to FIG. 3, description will be made. In step S3 described above, the controller 24 of the hydrogen station 2 reads in the filling protocol, specific to the vehicle 3, that is received via the communication device 21 and the controller 24 determines the filling flow rate with the use of the filling flow rate map included in the filling protocol, referring to the received tank pressure data and the received tank temperature data. In the case of the vehicle A, for example, when the received tank pressure is 40 MPa and the received tank temperature is 0° C., D4 (m³/min) is selected as the filling flow rate from the filling flow rate map Ma. Then, the controller 24 starts filling so that the filling flow rate selected is reached, and the controller 24 controls the degree of opening of the flow rate control valve 16 while monitoring the results of measurement by the flow meter 17. In this way, the hydrogen gas is filled into the gas tank 30 at the filling flow rate according to the tank pressure, the tank temperature, and the characteristics of the gas tank 30.

During filling, the tank pressure and the tank temperature may be acquired and these data may be sent to the hydrogen station 2 to update the filling flow rate. Specifically, the controller 24 of the hydrogen station 2 may change the filling flow rate determined at the time of starting filling in performing control by reselecting the filling flow rate according to the tank pressure and the tank temperature acquired during filling. In this way, it is possible to perform filling according to the state in the gas tank 30 that is being filled, or charged.

During the filling, at least one of the display device 22 of the hydrogen station 2 and the display device 48 of the vehicle 3 may indicate that the filling is being performed according to the filling protocol provided by the vehicle 3. With this indication, the filling operator can confirm that the control is being performed after the filling flow rate suitable for the vehicle 3 is selected.

Thereafter, when a predetermined filling amount of gas (the amount of gas to be filled that is designated by the filling operator or the filling amount for a full tank) has been filled into the gas tank 30, the supply of hydrogen gas from the hydrogen station 2 is stopped and the filling is ended (step S4). Also after the completion of the filling or only after the completion of the filling, the indication similar to the above indication, that is, for example, the indication that the filling has been performed according to the filling protocol provided by the vehicle 3 may be given on at least one of the display devices 22 and 48.

It is preferable that, after the completion of filling, the storing section (the above-described RAM, for example) of at least one of the controllers 24 and 46 of the gas filling system 1 temporarily store the history of transmission and reception between the communication device 44 and the communication device 21. The history of transmission and reception preferably contains the history indicating that the information containing the filling protocol has been transmitted from the communication device 44 to the communication device 21 in step S2, for example. Such a transmission/reception history may be stored in both of the hydrogen station 2 and the vehicle 3. However, the transmission/reception history is preferably stored in the vehicle 3. This is because it is possible to easily check whether the filling has been performed according to the flow shown in FIG. 3, at the time of an official vehicle inspection, for example. In other words, this is because if the transmission/reception history is stored only in the hydrogen station 2, it is troublesome to acquire the transmission/reception history concerning the filling of a particular vehicle 3 from the hydrogen stations 2 that are interspersed at various locations.

Operations and effects of the gas filling system 1 according to the above-described first embodiment will be described below. First, according to the first embodiment, the vehicle 3 is provided with a filling protocol, the filling protocol is sent to the hydrogen station 2 at the time of filling, and the hydrogen station 2 controls the filling operation according to the filling protocol. Thus, when the vehicle 3 is provided with the optimum filling protocol, it is possible to perform the filling adapted to the gas tank 30 of the vehicle 3 without being affected by other vehicles. In particular, when the filling protocol determined based on the characteristics of the gas tank 30 (heat dissipation capacity, for example) is used, it is possible to raise the filling flow rate for the gas tank 30 that is excellent in heat dissipation capacity and it is therefore possible to perform a smooth filling in a shorter period of time while the temperature of the inside of the gas tank 30 is prevented from exceeding an upper limit temperature.

In addition, because the filling protocol is provided from the vehicle 3 to the hydrogen station 2, it is necessary neither to prepare the filling protocol on the hydrogen station 2 side nor to renew the prepared filling protocol for each new vehicle (gas tank). Thus, it is possible to perform the optimum filling updated according to the progress of technology without impairing the merit of the technological progress of the gas tank 30 etc.

The filling protocol provided by the vehicle 3 side is sent to the hydrogen station 2 via communication. Thus, there is no need to manually input the filling flow rate determined in the vehicle 3 into the hydrogen station 2. In addition, when the type of communication is wireless communication, it is possible to reduce the burden of the filling operator as compared to the case of the communication through wire. Note that the communication through wire may be employed in the case of another embodiment. In addition, because the history of transmission and reception through communication is stored, it is possible to check whether the above-described optimum filling has been performed, at the time of an official vehicle inspection.

In addition, because the tank pressure and the tank temperature are used to determine the filling flow rate based on the filling flow rate map included in the filling protocol, it is possible to perform filling according to the state in the gas tank 30 that is the subject to be filled. In addition, because the tank pressure and the tank temperature are actually acquired, it is possible to determine the more optimal filling flow rate as compared to the case where these values are estimated. In an alternative embodiment, control may be performed after determining the filling flow rate without taking one of or both of the tank pressure and the tank temperature into consideration.

Figure 5:
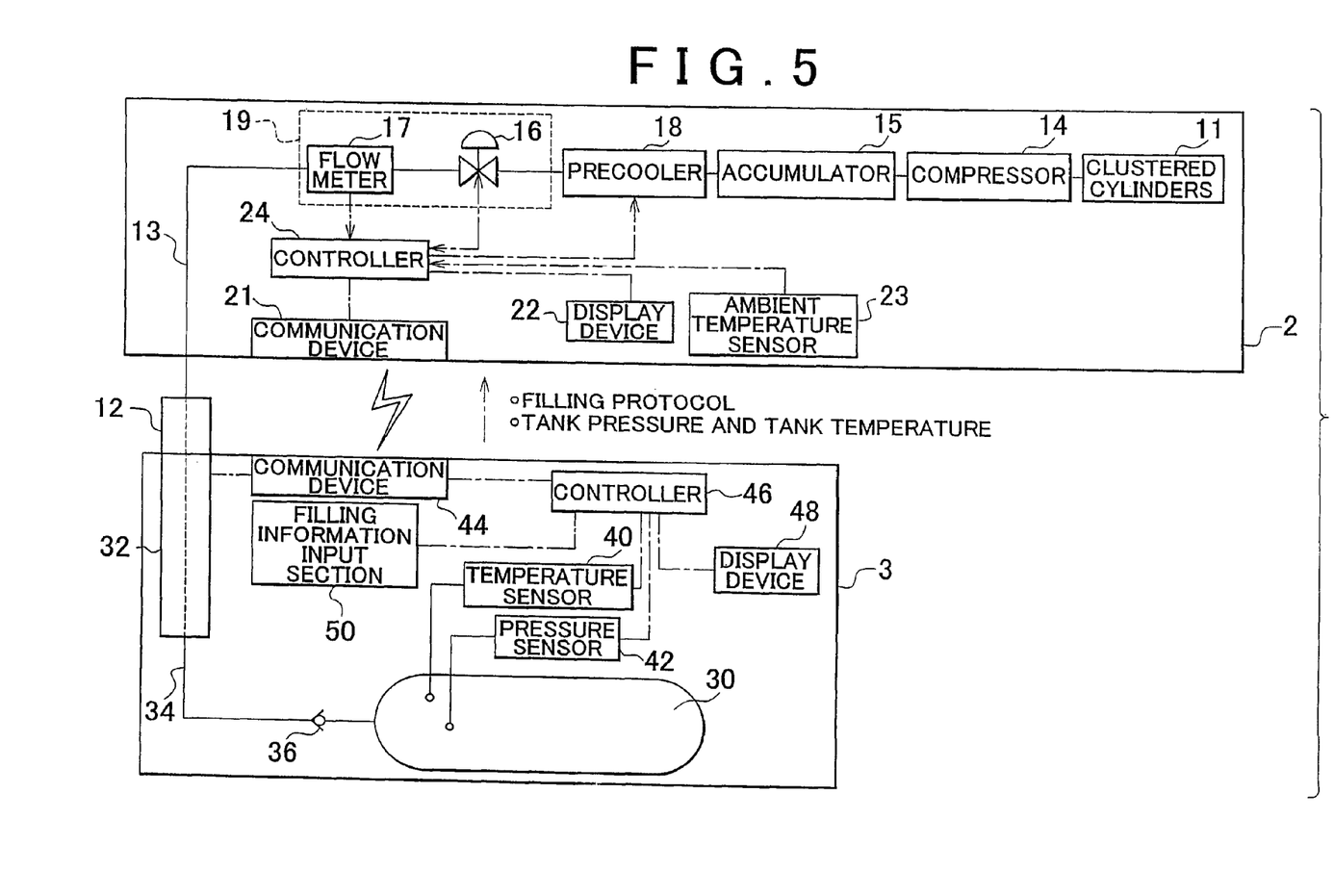
FIG. 5 is a configuration diagram of a gas filling system according to a second embodiment.

Next, with reference to FIG. 5, a gas filling system 1 according to a second embodiment, mainly the difference thereof from the above first embodiment, will be described. The difference from the first embodiment is that the vehicle 3 further includes a filling information input section 50. The filling information input section 50 is used for input of the filling information by the filling operator. For example, the filling information input section 50 may be part (operation panel) of the above-described display device 48 to enable the selection or designation of the filling information. However, the filling information input section 50 may be separate from the display device 48. The filling information may include the price to be paid for the filling (in this case, the filling amount corresponds to the price) in addition to the filling amount and the filling time.

Figure 3:
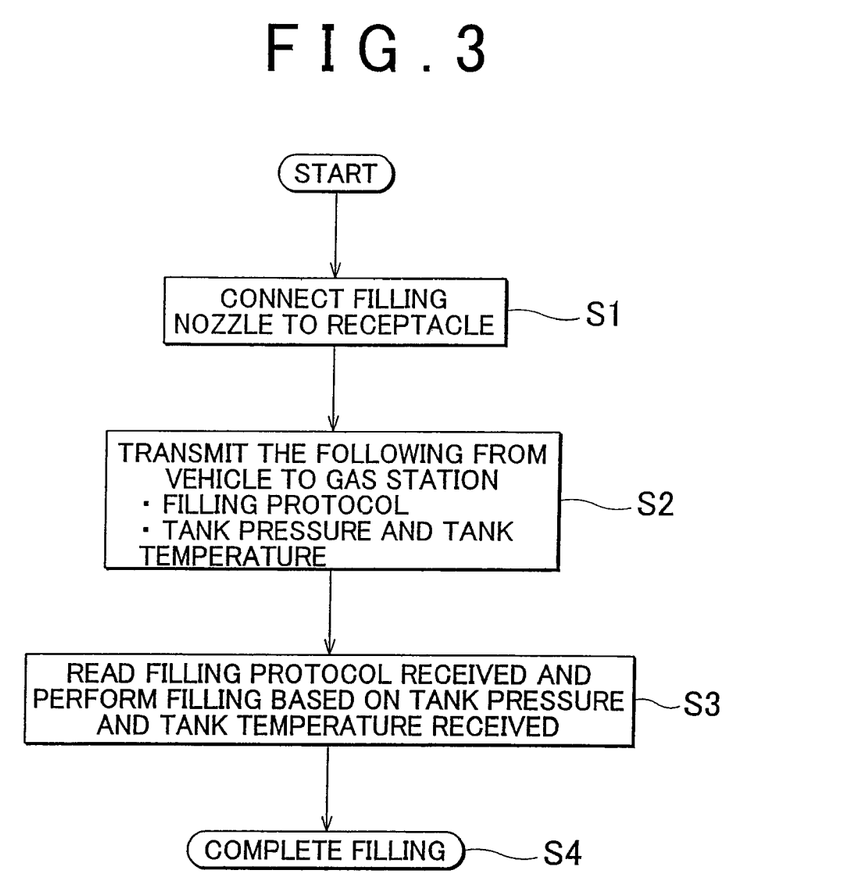
FIG. 3 is a flow chart showing a flow of a filling operation in the gas filling system according to the first embodiment.

In general, the input into the filling information input section 50 by the filling operator is performed before the operation of connecting the filling nozzle 12 (step S1 shown in FIG. 3). The filling information input into the filling information input section 50 is transmitted from the vehicle 3 to the hydrogen station 2 with the information, such as the filling protocol (step S2 shown in FIG. 2). Then, the controller 24 of the hydrogen station 2 controls the filling of hydrogen into the gas tank 30 according to the filling information transmitted (step S3 shown in FIG. 3).

Thus, according to the second embodiment, the operations and effects of the first embodiment are achieved and in addition, the filling operator can control (select or designate) the desired filling information, so that it is possible to perform the optimum filling desired by the filling operator. Note that, in another form, the filling information input section may be provided also in the hydrogen station 2 or only in the hydrogen station 2. Also in this case, the filling information input section may be incorporated into the display device 22.

<Modifications>

Next, two modifications of the gas filling system 1 that can be applied to the above embodiments will be described. Each modification can be applied to the embodiments either alone or in combination with another modification.

In a first modification, the tank pressure and the tank temperature may be estimated when the filling flow rate is determined. In this case, the tank pressure and the tank temperature can be estimated with the use of the device(s) on the gas filling apparatus 2 side. For example, with regard to the tank pressure, a pressure sensor may be provided in the gas line 13 of the hydrogen station 2 and the tank pressure may be estimated based on the result of detection by the pressure sensor immediately after starting filling. Meanwhile, the tank temperature may be estimated based on the result of detection by the ambient temperature sensor 23 immediately after starting filling.

In a second modification, the number of gas tanks 30 may be plural. When a plurality of gas tanks are mounted on the vehicle 3, the heat dissipation varies depending on the mounting position and the amount of discharge from individual gas tanks varies depending on the manner in which the gas is supplied to the fuel cell. Thus, when there are a plurality of gas tanks 30, it is preferable that the filling flow rate be determined from the filling flow rate map with the use of the information (tank temperature and tank pressure) on the gas tank whose temperature is the highest or on the gas tank whose pressure is the lowest among the plurality of gas tanks. In this way, it is possible to complete filling a predetermined filling amount of gas in a short period of time while preventing the temperature from reaching the upper limit temperature for every gas tank.

In the case of the second modification, the tank temperature and the tank pressure of each of the gas tanks may be acquired by providing each of the gas tanks with the temperature sensor 40 and the pressure sensor 42 or may be acquired with the use of one temperature sensor 40 and one pressure sensor 42 in total for all of the gas tanks. Alternatively, as described in connection with the second modification, the tank temperature and the tank pressure may be acquired by estimation for each of the gas tanks.

REFERENCE EXAMPLES

Last, two gas filling systems according to reference examples will be described.

Figure 6:
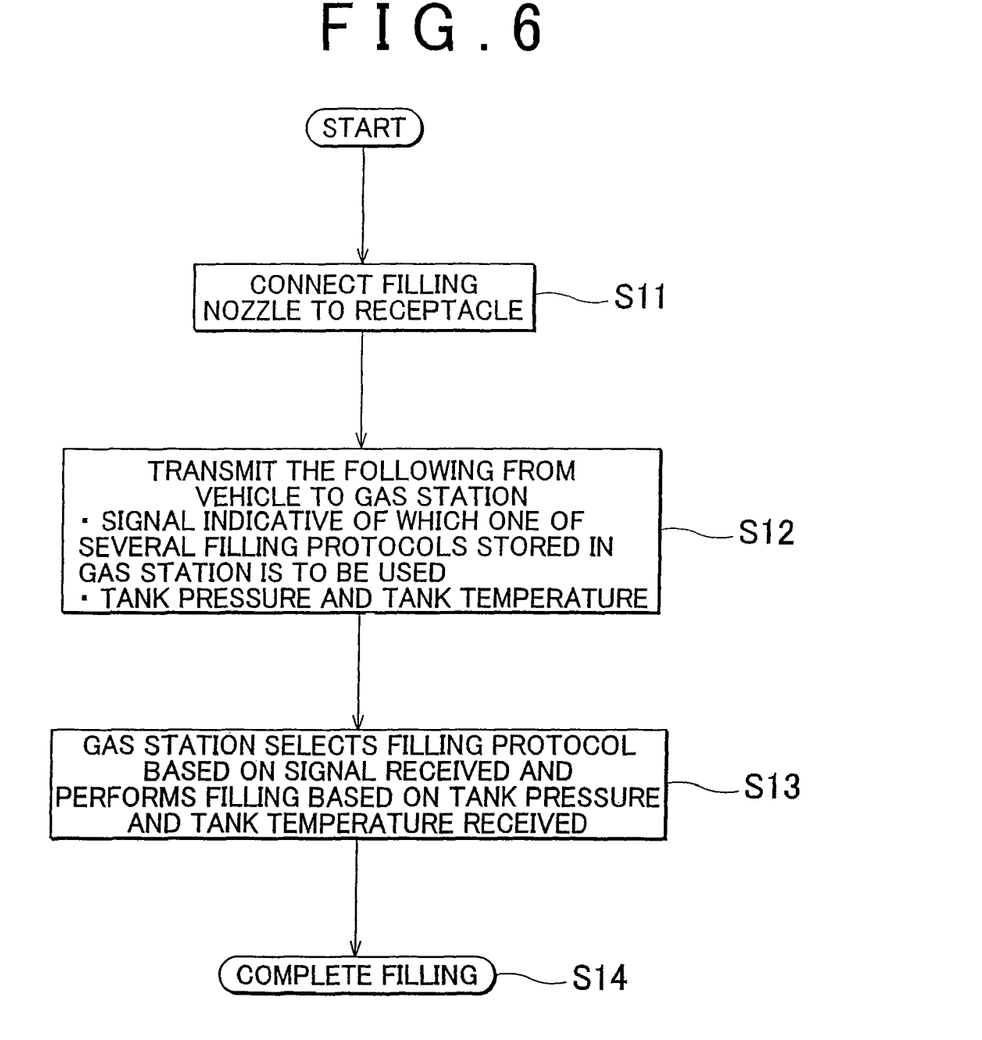
FIG. 6 is a flow chart showing a flow of a filling operation in a gas filling system according to a reference example.

The first reference example relates to the case where the hydrogen station 2 has several filling protocols. The filling operation flow of this case is shown in FIG. 6. The step S11 shown in FIG. 6 is the same as the step S1 shown in FIG. 3. However, steps S12 and S13 slightly differ from steps S2 and S3 shown in FIG. 3.

Specifically, in step S12, the vehicle 3 transmits the signal indicative of which one of several filling protocols stored in the hydrogen station 2 is to be used, that is, the signal for selecting the filling protocol that is adapted to the vehicle 3 (characteristics of the gas tank 30), to the hydrogen station 2 with the tank pressure data and the tank temperature data.

In step S13, the hydrogen station 2 selects the filling protocol based on the received signal. The hydrogen station 2 may perform control after determining the filling flow rate with reference to the received tank pressure data and the received tank temperature data with the use of the filling flow rate map included in the selected filling protocol. Thus, also in the case of the gas filling system according to the first reference example, the filling time is reduced because it is possible to use the filling protocol suitable for the vehicle 3 without being affected by other vehicles.

Figure 7:
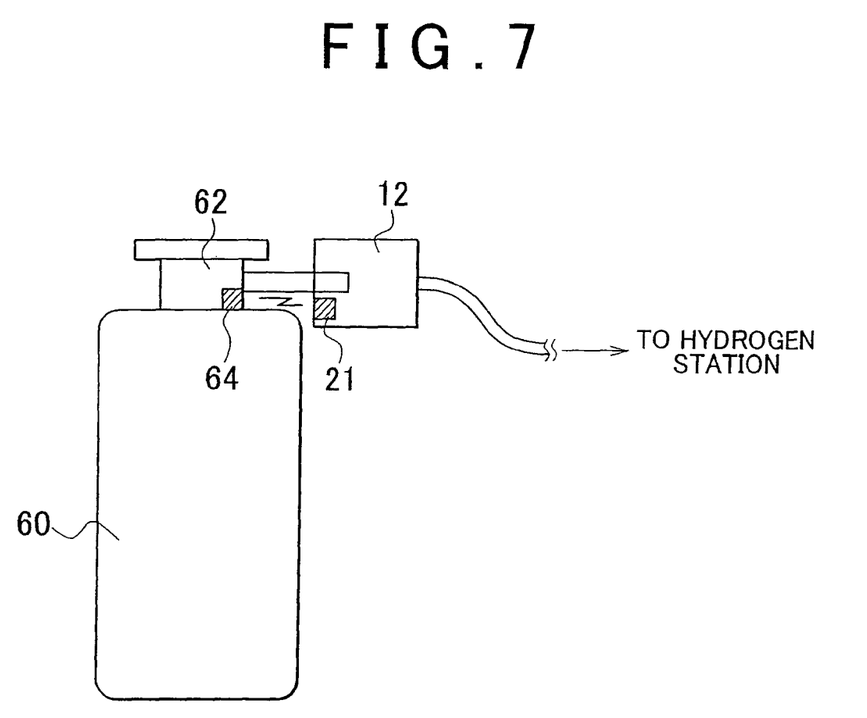
FIG. 7 is a configuration diagram of a gas filling system according to a reference example.

A second reference example relates to the case where a separate gas tank is filled independently of the vehicle. In this case, as shown in FIG. 7, correspondingly to the communication device 21 provided in the filling nozzle 12 of the hydrogen station 2, a communication device 64 is provided in a metal cap 62 of a high pressure gas tank 60 or a valve assembly that is screw-connected to the metal cap 62 so that a wireless communication is established when the filling nozzle 12 is connected to the metal cap 62 or the valve assembly.

The communication device 64 of the high pressure gas tank 60 stores the filling protocol described in the description of the above embodiments and is designed to transmit the stored filling protocol to the communication device 21 of the hydrogen station 2. Alternatively, the communication device 64 is designed to transmit, to the communication device 21, the signal indicative of which one of several filling protocols stored in the hydrogen station 2 is to be used, which has been described in the description of the first reference example. With such a configuration, it is possible to perform the optimum filling of hydrogen gas from the hydrogen station 2 into the high pressure gas tank 60. Thus, it is possible to reduce the burden of the filling operator and suppress the occurrence of human error and the filling is completed in a short period of time.

In the case of filling a separate high pressure gas tank 60, instead of the communication means, a combination of a data carrier and a reading device may be used. Instead of the communication device 64, a data carrier, such as an IC tag, a bar code, or a QR code is provided on the high pressure gas tank 60, for example. The location, at which the data carrier is provided, may be the metal cap 62 or the valve assembly. Alternatively, the data carrier may be provided on the outer surface of the tank body (cylindrical portion) with the use of paint or a seal.

In this case, on the hydrogen station 2 side, instead of the communication device 21, a reading device separate from the filling nozzle 12 (a bar code reader when the data carrier is a bar code) is prepared. At the time of filling, the data recorded on the data carrier, such as the filling protocol described in the description of the above embodiments or the indication as to which one of several filling protocols stored in the hydrogen station 2 is to be used, which has been described in the description of the above first reference example, is read with the use of the reading device on the hydrogen station 2 side. In this way, it is possible to reduce the burden of the filling operator and perform the optimum filling of the high pressure gas tank 60 as in the case of the form using the communication.

The gas filling system 1 according to the invention may be used not only in the case of hydrogen gas but also in the case of another gas, such as natural gas. In addition, the gas filling system 1 can be applied not only to the vehicle 3, but also to a mobile body, such as an air plane, a ship, or a robot, on which a gas tank to be filled with gas supplied from the outside is mounted.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A gas filling system comprising:
a vehicle having a gas tank; and
a gas station that supplies the gas tank with gas, wherein:
the vehicle includes a vehicle-side controller having a filling protocol, specific to, and stored in, the vehicle, that specifies a method of control, performed on the gas station side, that is used to fill the gas into the gas tank; and
the gas station controls filling of the gas into the gas tank according to the filling protocol provided by the vehicle-side controller;
the filling protocol includes a filling flow rate table in which one axis indicates tank pressure and the other axis indicates tank temperature,
the filling flow rate, detected at each time of filling, is based on both a detected tank pressure and a detected tank temperature,
the filling protocol is determined based on a characteristic of the gas tank, and
the characteristic of the gas tank is heat dissipation capacity of the gas tank.

2. The gas filling system according to claim 1, wherein:
the vehicle has a vehicle-side communication device connected to the vehicle-side controller; and
the gas station includes a station-side communication device that receives the filling protocol from the vehicle-side communication device and a station-side controller that is connected to the station-side communication device and controls the filling of the gas into the gas tank according to the filling protocol received.

3. The gas filling system according to claim 1, wherein:
the gas station includes a gas supply source, a compressor that compresses the gas supplied from the gas supply source, an accumulator that stores the gas compressed by the compressor, and a dispenser that supplies the gas tank with the gas supplied from the accumulator; and
at least one of the gas supply source, the compressor, the accumulator, and the dispenser is controlled according to the filling protocol.

4. The gas filling system according to claim 3, wherein the dispenser has a control valve that controls a flow rate of the gas supplied to the gas tank according to the filling protocol.

5. The gas filling system according to claim 1, further comprising a display device that displays an indication that the filling of the gas into the gas tank is being performed or has been performed according to the filling protocol provided by the vehicle-side controller.

6. The gas filling system according to claim 1, wherein:
at least one of the vehicle and the gas station has a filling information input section for inputting filling information; and
the gas station controls the filling of the gas into the gas tank according to the filling information input into the filling information input section.

7. The gas filling system according to claim 2, wherein:
the vehicle has a sensor that acquires information on an inside of the gas tank;
the station-side communication device also receives, from the vehicle-side communication device, the information acquired by the sensor; and
the station-side controller determines a filling flow rate according to the filling protocol received by the station-side communication device and the information on the inside of the gas tank in performing control.

8. The gas filling system according to claim 7, wherein:
the sensor acquires the information on the inside of the gas tank at the time of starting filling and during filling; and,
based on the information on the inside of the gas tank during filling, the station-side controller changes the filling flow rate that was determined based on the information on the inside of the gas tank at the time of starting filling.

9. The gas filling system according to claim 7, wherein the sensor includes at least one of a temperature sensor and a pressure sensor.

10. The gas filling system according to claim 6, wherein the filling information input section is adapted to enable a selection or designation of the filling information by a filling operator.

* * * * *